US006714852B1

(12) United States Patent  
Lorenz et al.

(10) Patent No.: US 6,714,852 B1  
(45) Date of Patent: Mar. 30, 2004

(54) OBSERVER FOR ENGINE CRANKSHAFT TORQUE

(75) Inventors: Robert Donald Lorenz, Madison, WI (US); Roy Inge Davis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/502,700

(22) Filed: Feb. 11, 2000

(51) Int. Cl.[7] .................. G06F 19/00; G06F 17/00; G06F 7/00; G05D 1/00; G06G 7/70

(52) U.S. Cl. .................. 701/102; 701/104; 701/106; 701/109; 703/7; 703/8

(58) Field of Search .................. 703/7, 8; 123/350; 701/101, 104, 105, 108, 102, 106, 109

(56) References Cited

U.S. PATENT DOCUMENTS

| | | | |
|---|---|---|---|
| 4,009,695 A | * 3/1977 | Ule | 123/90.13 |
| 4,691,288 A | 9/1987 | Kay et al. | 364/511 |
| 4,697,561 A | * 10/1987 | Citron | 123/339.14 |
| 4,699,097 A | 10/1987 | Tanaka et al. | 123/192 R |
| 4,792,905 A | * 12/1988 | Sekozawa et al. | 701/104 |
| 4,862,009 A | 8/1989 | King | 290/22 |
| 4,922,869 A | 5/1990 | Kadomukai et al. | 123/192 R |
| 4,962,570 A | * 10/1990 | Hosaka et al. | 123/399 |
| 4,977,508 A | 12/1990 | Tanaka et al. | 364/431.08 |
| 4,982,707 A | 1/1991 | Maeda et al. | 123/192 B |
| 5,020,491 A | 6/1991 | Mashino | 123/192 R |
| 5,033,425 A | 7/1991 | Kadomukai et al. | 123/192 R |
| 5,056,487 A | 10/1991 | Yamakado et al. | 123/436 |
| 5,087,869 A | 2/1992 | Kuriyama et al. | 322/15 |

(List continued on next page.)

OTHER PUBLICATIONS

Baleani et al. "HW/SW Codesign of an Engine Management System" Proc. of Design, Automation and Test in Europe. Jan. 2000. pp. 263–269.*

Jayaraman et al. "Applications of Discrete Event Simulation in the Design of Automotive Powertrain Manufacturing Systems" Proc. of 29th Winter Simulation Conference. 1997. pp. 758–764.*

Cuatto et al. "A Case Study in Embedded System Design: An Engine Control Unit". Proc. 35th ACM/IEEE Design Automation Conference. pp. 804–807.*

Windirsch et al. "Application–Specific Microelectronics for Mechatronic Systems". Proc. of European Design Automation Conference. pp. 194–199.*

Dictionary Entries for "Kinematics". http://dictionary.reference.com/search?q=kinematics. Printed Aug. 19, 2003.*

*Primary Examiner*—Kevin J. Teska  
*Assistant Examiner*—Ayal I. Sharon

(57) ABSTRACT

An engine crankshaft torque observer (10) and method of operation. An engine combustion process (14) is modeled (26) to develop modeled pressure estimates of combustion chamber pressures in engine cylinders according to certain engine inputs, such as fuel (20), EGR (22), and timing (24), that influence combustion chamber pressures. Kinematics (16) relating reciprocal motion of pistons in the engine cylinders to an engine crankshaft and engine friction (18) relating running friction of the engine to engine crankshaft rotation are also modeled (28; 30). A processor processes the certain engine inputs through the combustion process model to develop modeled pressure estimates which are processed through the kinematics model to develop modeled positive torque contribution due to combustion processes and through the friction model to develop modeled torque loss due to running friction. The modeled positive torque contribution due to combustion processes and the modeled torque loss due to running friction are processed to develop a measurement of indicted torque output of the engine. The combustion process model for developing modeled pressure estimates of combustion chamber pressures in engine cylinders is also novel.

6 Claims, 2 Drawing Sheets

U.S. PATENT DOCUMENTS

| | | | |
|---|---|---|---|
| 5,111,784 A | 5/1992 | Kuriyama et al. | 123/192.1 |
| 5,185,543 A | 2/1993 | Tebbe | 310/51 |
| 5,186,136 A | 2/1993 | Kadomukai et al. | 123/192.1 |
| 5,233,831 A * | 8/1993 | Hitomi et al. | 60/284 |
| 5,334,923 A * | 8/1994 | Lorenz et al. | 318/805 |
| 5,359,519 A * | 10/1994 | Jehanno | 701/108 |
| 5,537,967 A | 7/1996 | Tashiro et al. | 123/192.1 |
| 5,559,419 A * | 9/1996 | Jansen et al. | 318/808 |
| 5,565,752 A * | 10/1996 | Jansen et al. | 318/807 |
| 5,585,709 A * | 12/1996 | Jansen et al. | 318/807 |
| 5,619,976 A * | 4/1997 | Kitagawa et al. | 123/679 |
| 5,631,411 A * | 5/1997 | Harms et al. | 73/117.3 |
| 5,659,480 A * | 8/1997 | Anderson et al. | 700/186 |
| 5,666,917 A * | 9/1997 | Fraser et al. | 123/339.11 |
| 5,678,460 A * | 10/1997 | Malkowc | 74/574 |
| 5,692,472 A * | 12/1997 | Bederna et al. | 123/350 |
| 5,911,682 A * | 6/1999 | Kato et al. | 60/276 |
| 6,029,641 A * | 2/2000 | Suzuki et al. | 123/673 |
| 6,192,847 B1 * | 2/2001 | Davis | 123/179.4 |
| 6,223,120 B1 * | 4/2001 | Williams | 701/111 |
| 6,273,056 B1 * | 8/2001 | Shirakawa et al. | 123/305 |
| 6,276,334 B1 * | 8/2001 | Flynn et al. | 123/435 |
| 6,286,482 B1 * | 9/2001 | Flynn et al. | 123/435 |
| 6,314,333 B1 * | 11/2001 | Rajala et al. | 700/122 |
| 6,321,157 B1 * | 11/2001 | Sun et al. | 701/103 |
| 6,405,122 B1 * | 6/2002 | Yamaguchi | 701/106 |
| 6,443,125 B1 * | 9/2002 | Mendler | 123/316 |

* cited by examiner

OBSERVER FOR ENGINE CRANKSHAFT TORQUE

BACKGROUND OF THE INVENTION

1. Field of the Invention

This invention relates generally to internal combustion engines, and more particularly to an observer for engine crankshaft torque. A related aspect of the invention involves a combustion pressure process model for the observer.

2. Background Information

An observer is a computational or numerical process that may be implemented in a digital microprocessor or in a digital signal processor. The observer acts on inputs supplied to it from various sources, such as sensors, to produce an estimate, or observation, of a variable of interest that, for any of various reasons such as cost or convenience of access, may be poorly suited for direct measurement. As such, observers are useful in multi-variable control systems as alternatives to direct measurement of at least some of the variables of interest. A closed-loop observer in which an observer feedback signal is compared to a measured quantity in order to force the other estimated quantities to converge to their actual, correct values, may provide a higher degree of performance than one that is not closed-loop.

Torque of a rotating shaft is one variable that may be considered relatively difficult to accurately measure, even in laboratory conditions. Hence it is believed to be well suited for estimation by an observer. Moreover, torque observation may eliminate the need for a devoted torque sensor, thereby improving robustness of a multi-variable system.

In an automotive vehicle powertrain, observation of the torque of an internal combustion engine crankshaft would be useful in the performance of various control functions related to powertrain operation, including for example engine control, transmission shift control, combustion diagnostics, and dynamometer testing. In a hybrid electric vehicle that has a starter/alternator associated with the engine, the electric machine can develop torque that can be independently controlled to interact with engine crankshaft torque in beneficial ways including: reduction of the ripple content of crankshaft torque, boosting transient crankshaft during vehicle launch and acceleration, recapturing breaking energy during vehicle decelerations, and retarding or boosting crankshaft torque for faster engine speed slewing during controlled shifting. Accurate observation of crankshaft torque in real time would be advantageous in controlling starter/alternator torque so as to secure its desired interaction with crankshaft torque in real time. Active control of the electric machine may enable it to function in a manner equivalent to a mechanical flywheel, and hence a starter/alternator that is controlled in this manner may sometimes be referred to as an active flywheel. An active flywheel may function to produce a zero mean value, destructively interfering torque that, when superimposed on the crankshaft torque, tends to reduce or eliminate ripple in the crankshaft torque caused by periodic combustion events in the engine cylinders.

In order to command the starter/alternator to produce correct torque for smoothing the ripple, precise instantaneous measurement of crankshaft torque during combustion events is needed. A crankshaft torque observer possessing this capability could be made an integral part of an overall fuel economy strategy for lowering engine idle speed while improving NVH (noise, vibration, harshness).

It is believed fair to state that combustion in internal combustion engines is a very complex and only partially understood process. More accurate modeling of the process is seen to be a desirable objective in advancing the state of the art because it should admit of more accurate torque observation.

SUMMARY OF THE INVENTION

A generic aspect of the present invention relates to an engine crankshaft torque observer comprising: a combustion process model for developing modeled estimates of combustion chamber pressures in engine cylinders according to certain engine inputs that influence combustion chamber pressures; a kinematics model for relating reciprocal motion of pistons in the engine cylinders to an engine crankshaft; an engine friction model for relating running friction of the engine to engine crankshaft rotation; and a processor for processing the certain engine inputs through the combustion process model to develop the modeled pressure estimates, for processing the modeled pressure estimates through the kinematics model to develop modeled positive torque contribution due to combustion processes, for processing the modeled pressure measurements through the friction model to develop modeled torque loss due to running friction, and for processing the modeled positive torque contribution due to combustion processes and the modeled torque loss due to running friction to develop an estimate of indicted torque output of the engine.

Another generic aspect relates to a method of engine crankshaft torque observation comprising: modeling an engine combustion process to develop modeled estimates of combustion chamber pressures in engine cylinders according to certain engine inputs that influence combustion chamber pressures; modeling engine kinematics relating reciprocal motion of pistons in the engine cylinders to an engine crankshaft; modeling engine friction relating running friction of the engine to engine crankshaft rotation; and processing the certain engine inputs through the combustion process model to develop the modeled pressure estimates, processing the modeled pressure estimates through the kinematics model to develop modeled positive torque contribution due to combustion processes, processing the modeled pressure estimates through the friction model to develop modeled torque loss due to running friction, and processing the modeled positive torque contribution due to combustion processes and the modeled torque loss due to running friction to develop an estimate of indicted torque output of the engine.

One related aspect of the invention concerns the combustion process model for developing modeled estimates of combustion chamber pressures in the engine cylinders according to certain engine inputs that influence combustion chamber pressures. Another related aspect concerns the method of modeling the engine combustion process.

Further aspects will be disclosed and perceived from a reading of the ensuing description and claims with reference to the accompanying drawing.

BRIEF DESCRIPTION OF THE DRAWING

The drawing that will now be briefly described is incorporated herein to illustrate a preferred embodiment of the invention and a best mode presently contemplated for carrying out the invention.

DESCRIPTION OF THE PREFERRED EMBODIMENT

Figure 1:
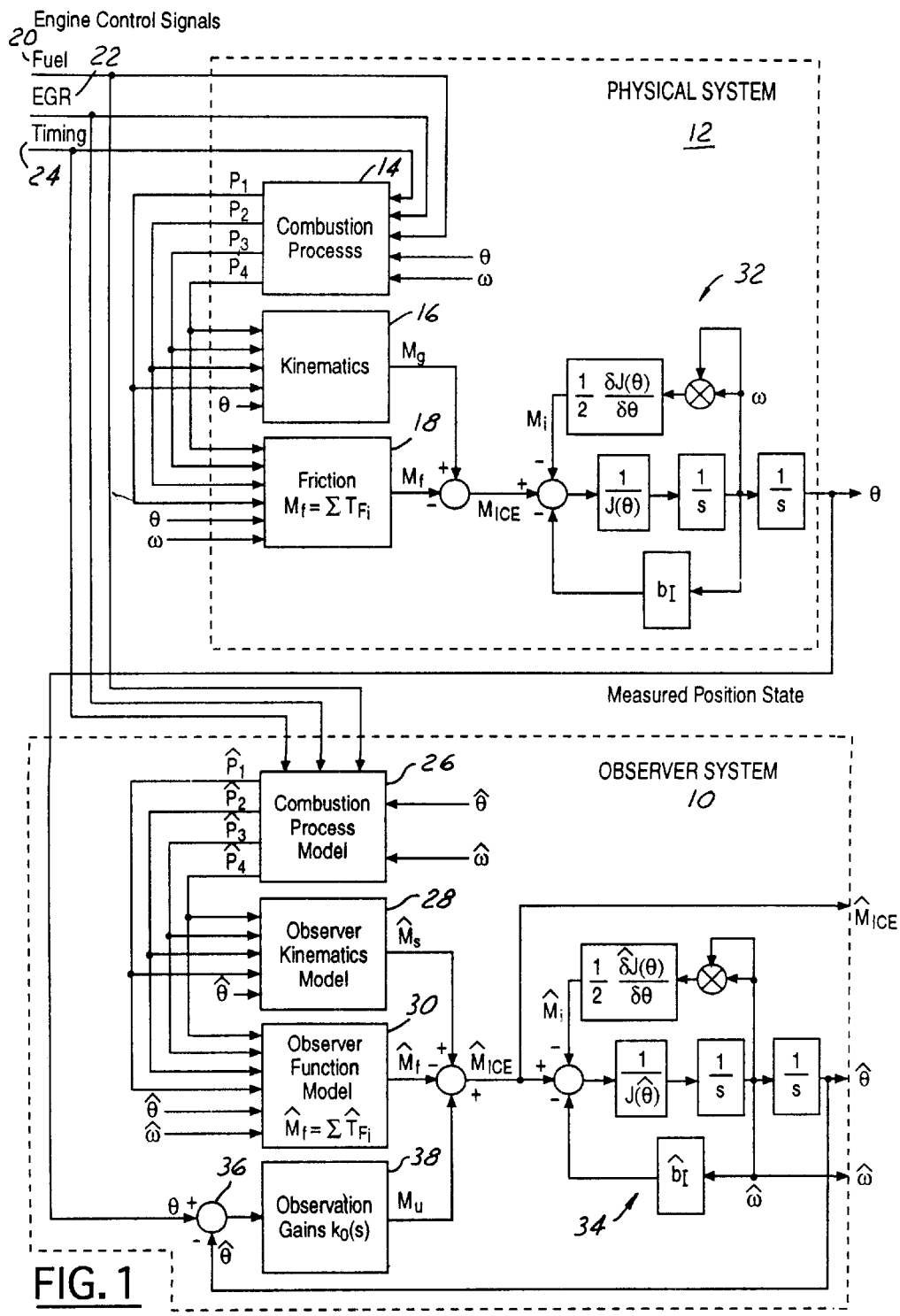
FIG. 1 is a schematic block diagram of an example of a crankshaft torque observer shown in association with an engine pursuant to principles of the present invention.

FIG. 1 shows an exemplary embodiment of the present invention comprising an observer system 10 in functional association with a physical system 12. The physical system comprises an automotive vehicle internal combustion engine whose indicated torque output $M_{ICE}$ is a function of variables, including: a combustion process 14 that occurs within the engine; kinematics 16 that are inherent in the engine design; running friction 18; and certain input variables, such as fuel 20. EGR (exhaust gas recirculation) 22, and, timing 24, for example the timing of fuel injections in the case of an indirect-injected diesel engine, or spark timing in the case of a spark-ignited engine.

Fuel 20 represents a fuel request to the engine, for example a signal supplied by a throttle position sensor corresponding to the position of an accelerator pedal operated by a driver of a vehicle. EGR 22 represents an amount of exhaust gas that is being recirculated by an EGR system under control of a controller that processes various input data to determine a suitable amount of exhaust gas recirculation for given values of that input data. The controller also processes various input data to determine proper timing of fuel injection into engine cylinders.

Fuel, EGR and timing are inputs that, for a given engine design, determine pressures $P_1$, $P_2$, $P_3$, $P_4$ in individual combustion chambers of the engine as the engine operates, the particular embodiment portrayed by this example being a four-cylinder engine. Because the volumes of the combustion chambers are continuously changing as the engine operates, engine crankshaft position $\theta$ and engine speed $\omega$ (RPM) are also inputs to the combustion process.

Pressures $P_1$, $P_2$, $P_3$, $P_4$ act on the crankshaft through piston-connecting rod combination constituting kinematics 16. Because the geometries of these crank mechanisms for converting combustion chamber pressures into crankshaft torque are continuously changing as the crankshaft rotates, kinematics 16 is also a function of engine crankshaft position $\theta$. Ultimately, combustion process 14 yields a positive gas pressure torque contribution $M_g$ to the indicated torque output $M_{ICE}$.

Indicated torque output $M_{ICE}$ is equal to the positive torque contribution $M_g$ from combustion minus torque lost due to running friction 18. The lost running torque $M_f$ is a function of combustion pressures $P_1$, $P_2$, $P_3$, $P_4$, crankshaft position $\theta$ and engine speed $\omega$, and hence both of those variables are also inputs to running friction 18.

Observer system 10 is created by modeling elements corresponding to combustion process 14, kinematics 16, and running friction 18. Hence, observer system 10 comprises a combustion process model 26, a kinematics model 28, and a running friction model 30. Variables fuel 20, EGR 22, and timing 24 are inputs to combustion process model 26 that are processed in accordance with the model to develop values of modeled combustion pressures $P_1$hat, $P_2$hat, $P_3$hat, $P_4$hat in the combustion chambers of the respective engine cylinders. The values $P_1$hat, $P_2$hat, $P_3$hat, $P_4$hat are inputs to kinematics model 28 and running friction model 30, and are processed by the respective models 28, 30 to develop respective values of modeled positive torque contribution $M_g$hat and of modeled torque lost due to running friction $M_f$.

The engine of the physical system may operate over a range of torque loads extending from no load to maximum load. The load will obviously influence the speed at which the engine operates. FIG. 1 incorporates several mathematical blocks, designated by the general reference numeral 32, showing the effect of an arbitrary load $b_l$ on physical system 12, and of the varying, crankangle-dependent engine inertia, $J(\theta)$. The crankshaft position output $\theta$ may be obtained from any crankshaft position signal source of suitable angular resolution, one degree resolution being a satisfactory example.

The varying, crankangle-dependent engine inertia is computed using the equation $$J(\theta) = \left\{2m_{rec}r^2 + \frac{m_{rec}r^4}{2L^2}\right\} - 2m_{rec}r^2\cos(2\theta) - \frac{m_{rec}r^4}{2L^2}\cos(4\theta)$$

wherein $m_{rec}$ is the reciprocating portion of the piston and connecting rod masses, r is the crank radius, and L is the length of the connecting rod.

Because of the variation in inertia, an additional torque component is created which is proportional to the product of the square of the engine rotational speed and the partial derivative of the inertia expression above. This partial derivative is found to be $$\frac{\partial J(\theta)}{\partial \theta} = 4m_{rec}r^2\sin(2\theta) + \frac{2m_{rec}r^4}{L^2}\sin(4\theta)$$

Inclusion of these crankangle-dependent terms in the physical system model 12, and in the corresponding observer system 10, as represented by the collective blocks 32 and 34 respectively, effects a significant improvement in accuracy of the dynamics of the model and observer.

Observer system 10 incorporates a model, 34 generally, corresponding to the collective blocks 32. Model 34 develops modeled crankshaft speed and position signals $\omega$hat and $\theta$hat, respectively. Observer system 10 provides a modeled indicated torque output $M_{ICE}$hat that is equal to the modeled positive torque contribution $M_g$hat minus the modeled torque lost due to running friction $M_f$hat.

For securing correspondence of the operation of observer system 10 to the running of the engine of physical system 12, the crankshaft position signal from the physical system is input to a summing junction 36 of the observer system where the modeled crankshaft position signal $\theta$hat is subtracted to create an error signal. That error signal is utilized by a dynamic observer controller 38 to develop an output that is algebraically summed with signals $M_g$hat and $M_f$hat. In this way, the observer system operation is enabled to very closely track the operation of the physical system by means of the closed-loop feedback of the estimated state $\theta$hat.

The dynamic observer controller 38 can be a general proportional plus integral plus derivative (PID) controller, among many possible controller implementations. It will be understood by those skilled in the art that this is not a limiting feature of the present invention. Irrespective of the type of controller used, selection of the gains or coefficients of the controller's transfer function is driven by the desire to drive the position error to zero with the desired transient response. This is accomplished by considering the eigenvalues of the characteristic equation of the open loop observer and selecting the controller gains appropriately to create the desired closed loop characteristic equation eigenvalues. Proper selection of the gains or transfer function coefficients allows for the desired transient response of the observer to errors between the estimated and actual position.

Combustion dynamics are reflected in the character of the cylinder pressure waveform, and consequently cylinder-by-cylinder modeling that accurately captures those dynamics should enhance the accuracy of observation of engine torque.

Characteristics of a typical cylinder pressure profile as a function of crankshaft position, i.e., waveform phasing, amplitude, duration, and general shape, remain relatively constant with respect to crankangle over the entire operating region of the engine. This fact is an achievement of the current state of the art in electronic engine controls although some variations may occur even under well controlled engine operations due to the complexity of the process. A cylinder pressure model has been developed in conjunction with the inventive torque observer based on cylinder pressure measurements made on an actual engine. The combustion pressure waveform is considered to consist of two parts: one, an underlying base component due to the compression of the cylinder gasses, that occurs during motoring of the engine, and two, an incremental component due to the combustion of the fuel.

In the course of observer development, instrumentation was added to the engine to obtain actual in-cylinder pressure measurements. These measurements characterize the engine as a function of engine speed (RPM) and injection pump fuel lever position (FLVR), which correlates with mass of fuel introduced.

A base compression (or motoring) prototype waveform and an incremental combustion (or firing) waveform were determined from the test data. Then the two were combined by a method found to provides very close estimates of the actual pressure under varying engine RPM and fueling conditions.

Once actual motoring and firing prototype waveforms had been determined, a scaling function was developed for each in order to approximate the measured data. That scaling is a function of RPM and FLVR. Also, an offset that is a function of RPM was added to account for the varying intake manifold pressure at different speeds. Details of the offsets and scaling functions are given when describing the indicated torque feedforward design of the observer. The general expression for pressure can be written as $$p(\theta, N, FLVR) = p_{zero}(\theta) \cdot c_1(N) + \Delta p(\theta) \cdot c_2(N, FLVR) + p_0(N)$$

where $p_{zero}(\theta)$ and $\Delta p(\theta)$ are the motoring and incremental pressure prototypes, respectively, N is engine speed in RPM, FLVR is fuel lever position in percent, $c_1$ and $c_2$ are derived factors, and $p_0(N)$ is an offset to account for changes in manifold pressure.

These prototype waveforms may be used in a simulation to generate instantaneous cylinder pressure input to a processor for computing the indicated torque using the kinematic relationships inherent in the engine mechanism. Given that the cranks are phased 180° from each other in an in-line four cylinder design, some simplification of this expression is accomplished when it is expanded. This simplified expression, assuming a 1-3-4-2 firing order, is $$M_{ICE} = \frac{\pi B^2 r}{4} \sin(\theta)$$
$$\left\{ [P_1(\theta) + P_4(\theta)]\left(1.0 + \frac{r}{L}\cos(\theta)\right) - [P_2(\theta) + P_3(\theta)]\left(1.0 - \frac{r}{L}\cos(\theta)\right) \right\}$$

Note in the above equation that two sets of two piston pressures are found to be in phase with each other and the indicated torque waveform associated with those two pistons has a period of one engine revolution or 360 degrees of crankangle. This allows a simplification in the simulation in that the two pressures for the in-phase pistons can be added together and treated as a single pressure waveform. Since the waveforms repeat at 360 degree intervals, this also reduces the computer memory storage requirements for a table representing the prototype waveform. If each cylinder pressure waveform was to be separately represented, each would require 720 degrees of information, since the period of motion of a single piston is two engine revolutions. This feature is fortunate for the real-time implementation of the observer, which uses this same model.

In order to evaluate the accuracy of this approach to simulating the waveforms, comparisons were made between simulated and actual measured waveforms. The close agreement of the results indicates that this is an acceptable manner of simulating different conditions. The method is used in the observer to generate feedforward pressure signals.

Figure 2:
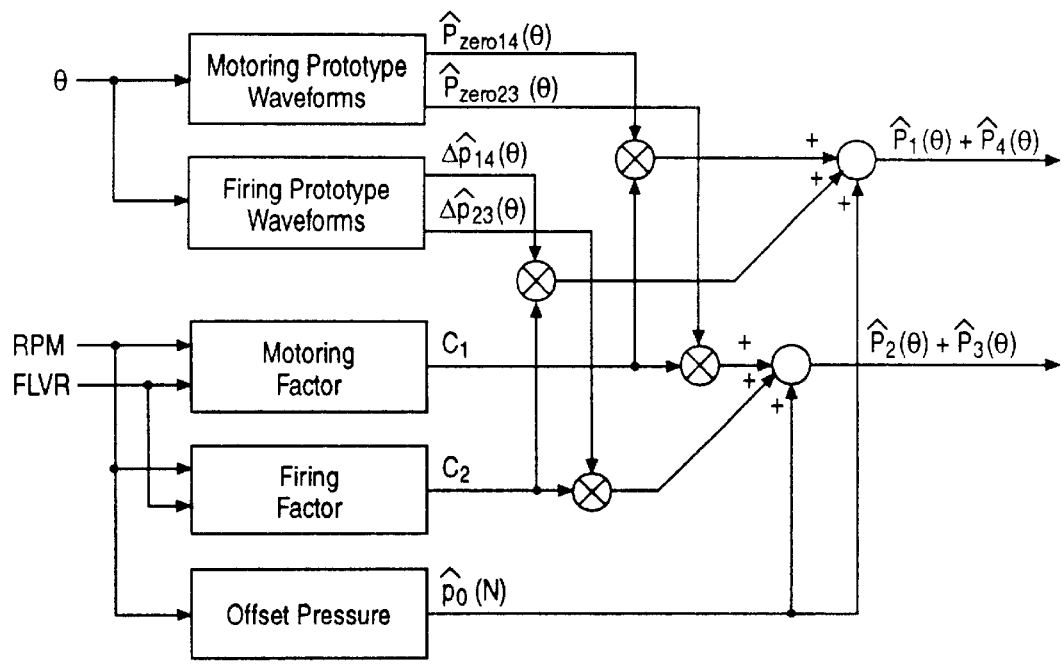
FIG. 2 is a schematic block diagram depicting a model for developing cylinder pressure estimates.

Computing the indicated torque estimate for use as a feedforward signal within the observer consists of two parts: making an estimate of the combustion pressure that is a function of the engine operating point; and propagating this through the kinematic relations that describe the slider crank mechanism of the engine. The observer pressure synthesis, described in more complete detail below and with reference to FIG. 2, is believed to be an efficient and accurate method that is suitable for real time implementation.

During engine operation, the observer is provided with engine position ($\theta$) and average speed (RPM) from an encoder and with fuel lever position (FLVR) from a position sensor mounted on the injection pump lever. The observer then applies speed and FLVR dependent gains to the motoring ($p_{zero}(\theta)$) and firing ($\Delta p(\theta)$) prototype waveforms, which are indexed by crankangle. These scaled prototypes are then added together and further combined with a speed-dependent zero offset to produce the total instantaneous estimate of cylinder pressure. This is done independently for the summed pressures for cylinders 1 and 4, and cylinders 2 and 3.

In the observer, using engine design parameter estimates as indicated by the hatted quantities, the indicated torque estimate is given by $$\hat{M}_{ICE} = \frac{\pi \hat{B}^2 \hat{r}}{4} \sin(\theta)$$
$$\left\{ [\hat{P}_1(\theta) + \hat{P}_4(\theta)]\left(1.0 + \frac{\hat{r}}{\hat{L}}\cos(\theta)\right) - [\hat{P}_2(\theta) + \hat{P}_3(\theta)]\left(1.0 - \frac{\hat{r}}{\hat{L}}\cos(\theta)\right) \right\}$$

An initial value of the factors necessary to apply to the motoring and firing prototype waveforms can be estimated from the peak pressures used to normalize the measured waveforms to unity amplitude. These initial factors are further adjusted in an iterative procedure to obtain estimated waveforms that minimize the error when compared to the measured waveforms. These factors are given in the below tables, given below for the actual engine example, which are extended beyond the matrix of measured speed-FLVR data points to ensure that the interpolation function used to obtain intermediate speed-FLVR points produces reasonable values for the gains.

| | Motoring Factor ($c_1$) Lookup Table | | | | | |
|---|---|---|---|---|---|---|
| | RPM⇒ | | | | | |
| % FLVR⇓ | 500 | 1000 | 1500 | 2000 | 2500 | 5000 |
| 0 | 1 | 4.85 | 5.3 | 5.7 | 5.9 | 6.9 |
| 10 | 3 | 4.85 | 5.3 | 5.7 | 5.9 | 6.9 |

-continued

| 20  | 3 | 4.85 | 5.2  | 5.78 | 6    | 7.0  |
| 30  | 3 | 4.85 | 5.3  | 5.8  | 6.2  | 7.2  |
| 40  | 3 | 4.85 | 5.42 | 6.6  | 6.75 | 7.75 |
| 50  | 3 | 4.85 | 5.42 | 7.55 | 8    | 9    |
| 100 | 3 | 4.85 | 5.42 | 7.55 | 8    | 9    |

Firing Factor ($c_2$) Lookup Table

| | RPM⇒ | | | | | |
|---|---|---|---|---|---|---|
| % FLVR⇓ | 500 | 1000 | 1500 | 2000 | 2500 | 5000 |
| 0   | 1     | 1     | 1     | 1     | 1     | 1     |
| 10  | 1.3   | 1.3   | 1.2   | 1.3   | 1.4   | 1.4   |
| 20  | 2.373 | 2.375 | 2     | 2.275 | 2.35  | 2.35  |
| 30  | 3.3   | 3.3   | 3.7   | 3.85  | 3.875 | 3.875 |
| 40  | 4.275 | 4.275 | 4.275 | 4.2   | 4.3   | 4.3   |
| 50  | 4.95  | 4.95  | 4.95  | 4.95  | 5.2   | 5.2   |
| 100 | 5.5   | 5.5   | 5.5   | 5.5   | 5.8   | 5.8   |

In addition, the offset that converts the cylinder relative pressures to absolute pressures based on measured intake manifold pressures from the actual engine of the example are given in the next table.

Manifold Pressure Offset ($p_0$, Pa) Lookup Table

| RPM⇒    | 500    | 1,000  | 1,500   | 2,000   | 2,500   | 5,000   |
|---------|--------|--------|---------|---------|---------|---------|
| Offset⇒ | 94,433 | 97,062 | 100,030 | 106,731 | 114,062 | 125,000 |

While a presently preferred embodiment has been illustrated and described, it is to be appreciated that the invention may be practiced in various forms within the scope of the following claims. For example, principles are applicable to a spark-ignited gasoline engine, in which case the timing input would be spark ignition timing.

What is claimed is:

1. An engine crankshaft torque observer comprising:
    a combustion process model for developing modeled pressure estimates of combustion chamber pressures in engine cylinders according to certain engine inputs that influence combustion chamber pressures;
    a kinematics model for relating reciprocal motion of pistons in the engine cylinders to an engine crankshaft;
    an engine friction model for relating running friction of the engine to engine crankshaft rotation; and
    a processor for processing the certain engine inputs through the combustion process model to develop the modeled pressure estimates, for processing the modeled pressure estimates through the kinematics model to develop modeled positive torque contribution due to combustion processes, for processing the modeled pressure estimates through the friction model to develop modeled torque loss due to running friction, and for processing the modeled positive torque contribution due to combustion processes and the modeled torque loss due to running friction to develop measurement of indicted torque output of the engine,
    in which the certain engine inputs include a fuel input, an EGR input, and a timing input.

2. An engine crankshaft torque observer as set forth in claim 1 in which the processor develops a modeled crankshaft position signal, processes that modeled crankshaft position signal with an actual crankshaft position signal to develop an error signal, and processes that error signal to cause the operation of the observer to track engine operation.

3. A method of engine crankshaft torque observation comprising:
    modeling an engine combustion process to develop modeled pressure estimates of combustion chamber pressures in engine cylinders according to certain engine inputs that influence combustion chamber pressures;
    modeling engine kinematics relating reciprocal motion of pistons in the engine cylinders to an engine crankshaft;
    modeling engine friction relating running friction of the engine to engine crankshaft rotation; and
    processing the certain engine inputs through the combustion process model to develop the modeled pressure estimates, processing the modeled pressure estimates through the kinematics model to develop modeled positive torque contribution due to combustion processes, processing the modeled pressure estimates through the friction model to develop modeled torque loss due to running friction, and processing the modeled positive torque contribution due to combustion processes and the modeled torque loss due to running friction to develop a measurement of indicted torque output of the engine, in which the step of modeling an engine combustion process to develop modeled pressure estimates of combustion chamber pressures in engine cylinders according to certain engine inputs that influence combustion chamber pressures comprises modeling the engine combustion process according to engine inputs that include a fuel input, an EGR input, and a timing input.

4. A method of engine crankshaft torque observation as set forth in claim 3 including steps of developing a modeled crankshaft position signal, processing that modeled crankshaft position signal with an actual crankshaft position signal to develop an error signal, and processing that error signal to cause the observation process to track engine operation.

5. A combustion process model for developing estimates of combustion chamber pressures in cylinders of an engine according to certain inputs that influence combustion chamber pressures, the model being embodied in a processor and comprising:
    a base component model providing an output that models compression of gasses occurring within the cylinders during motoring of the engine;
    an incremental component model providing an output that models compression of gasses occurring within the cylinders due to combustion of fuel in the cylinders;
    a first scaling function that is itself a function of engine speed and fuel input into the engine for scaling the output of the base component model;
    a second scaling function that is itself a function of engine speed and fuel input into the engine for scaling the output of the incremental component model;
    and an offset that is a function of engine speed to account for variation in engine intake manifold pressure;
    and wherein the processor processes the output of the base component model, the incremental component model, the first scaling function, the second scaling function, and the offset to estimate combustion chamber pressures in the cylinders.

6. A method of estimating combustion chamber pressures in cylinders of an engine according to certain inputs that influence combustion chamber pressures, the method comprising the steps of:

modeling compression of gasses occurring within the cylinders during motoring of the engine;

modeling compression of gasses occurring within the cylinders due to combustion of fuel in the cylinders; and estimating the combustion chamber pressures by scaling the modeled compression of gasses occurring within the cylinders during motoring of the engine by a first scaling function that is itself a function of engine speed and fuel input into the engine;

scaling the modeled compression of gasses occurring within the cylinders due to combustion of fuel in the cylinders by a second scaling function that is itself a function of engine speed and fuel input into the engine; and offsetting both the scaled modeled compression of gasses occurring within the cylinders during motoring of the engine and the scaled modeled compression of gasses occurring within the cylinders due to combustion of fuel in the cylinders by an offset that is a function of engine speed to account for variation in engine intake manifold pressure.

* * * * *